UNITED STATES PATENT OFFICE 2,324,936

CONDENSATION OF CYANOCARBOXYLIC ACID WITH POLYAMINE

Hugo Kroeper, Heidelberg, and Hans Haussmann, Mannheim, Germany; vested in the Alien Property Custodian No Drawing. Application January 22, 1940, Serial No. 315,037. In Germany January 11, 1939

2 Claims. (Cl. 260—2)

The present invention relates to a process for the production of condensation products.

We have found that condensation products suitable for a wide range of applications are obtained by causing mononitriles which besides the nitrile group contain a carboxylic group in the molecule, to react at elevated temperature with amines containing in the molecule at least two amino groups bearing at least one hydrogen atom directly attached to the amino nitrogen, i. e., primary or secondary amino groups. A treatment with hydrating agents may be carried out during or after the reaction. The carboxylic group may be present in the free or in a modified state, i. e. there may be employed the free nitrile carboxylic acids, themselves as well as for example their esters, anhydrides, halides, amides or thioamides. When a simultaneous or subsequent treatment with hydrating agents is desired it is advantageous to start from the nitrile carboxylic acids themselves.

Suitable nitrile-carboxylic acids are, for example, those which have the nitrile group and the carboxyl group linked to one another by one or more carbon atoms. The carbon skeleton of the nitrile carboxylic acids may be of aliphatic, cycloaliphatic, mixed aliphatic-aromatic or aromatic character; if desired, it may be interrupted by hetero atoms or groupings comprising hetero atoms. Compounds of the following formulae are given as examples of suitable nitrile carboxylic acids:

NC—(CH₂)₄CO₂H
NC(CH₂)₃—O—(CH₂)₃—CO₂H
NC—(CH₂)₃—S—(CH₂)₃—CO₂H

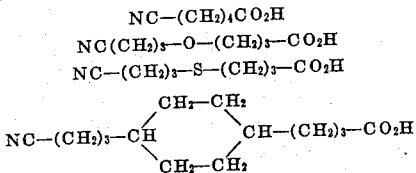

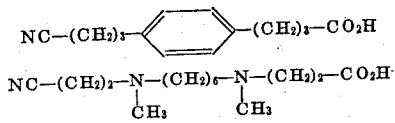

and

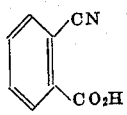

Among suitable amines we may mention for example pentamethylenediamine, hexamethylenediamine, 1,4-cyclohexyldiethylamine, p-phenylenediamine, triethylenetetramine, benzidine, aminoethylpiperazine, N.N'-di-(acetylpropylamino)-hexamethylenediamine

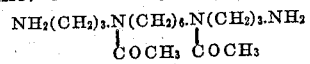

and thiodibutylamine

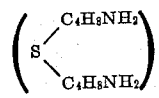

The reaction is carried out at elevated temperatures, which may range for example up to about 300° C., advantageously at temperatures of between 150° and 300° C., varying according to the type of the initial materials used and the nature of the products desired. By prolonged heating and employment of high temperatures high-molecular products are obtained. In many cases it is preferable to conduct the reaction in closed vessels, especially in case the condensation is carried out at temperatures above the boiling point of one or both of the initial substances.

The quantities in which the initial substances are used may be varied within wide limits. Usually 1 molecular proportion of diamine is used to about 1 molecular proportion of nitrile carboxylic acid or 2 molecular proportions of an amine having 3 primary or secondary amino groups are used to about 3 molecular proportions of nitrile carboxylic acids etc. By using one of the initial substance in excess, the length of the chain of the condensation products may be varied and more or less highly polymerized products obtained. In many cases it is useful to subject the polymerized products for heat treatment in vacuo.

If a treatment with hydrating agents be carried out during or after the condensation, polyamides are formed, ammonia or ammonium salts being split off.

Among hydrating agents we may mention, for example, water which may be added as such or generated by a simultaneous reaction attended with the formation of water; thus carboxylic acids or alcohols may be heated together with the initial substances from which water is split off upon reaction with the amine used.

The following example serves to illustrate how the present invention may be carried out in practice, but the invention is not restricted to this example; the parts are by weight.

Example 113 parts of gamma-cyanobutyric acid and 116 parts of hexamethylenediamine are slowly heated to 160° C. with reflux cooling; a vigorous evolution of ammonia takes place. The temperature is then slowly raised to 290° C. and heating continued at this temperature for another 12 hours until the evolution of ammonia is completed. The product obtained shows properties similar to those of polyamides.

What we claim is:

1. The process for the production of condensation products which consists in causing a mononitrile containing in the molecule as the only reactive group besides the nitrile group a carboxylic group to react at a temperature between 150° and 300° C. with an amine containing in the molecule as the only reactive groups at least two amino groups bearing each at least one hydrogen atom directly attached to the amino nitrogen.

2. The process for the production of condensation products which consists in causing gamma-cyanobutyric acid to react at a temperature between about 150° and 300° C. with hexamethylene diamine.

HUGO KROEPER.
HANS HAUSSMANN.